US008287783B2

(12) United States Patent
Quadrio Curzio

(10) Patent No.: US 8,287,783 B2
(45) Date of Patent: Oct. 16, 2012

(54) MANUFACTURED ITEM FOR THE BUILDING INDUSTRY

(75) Inventor: Alessandro Quadrio Curzio, Milan (IT)

(73) Assignee: Petracem S.r.l., Milan (IT)

( * ) Notice: Subject to any disclaimer, the term of this patent is extended or adjusted under 35 U.S.C. 154(b) by 249 days.

(21) Appl. No.: 12/600,533

(22) PCT Filed: May 13, 2008

(86) PCT No.: PCT/IB2008/051880
§ 371 (c)(1),
(2), (4) Date: Feb. 4, 2010

(87) PCT Pub. No.: WO2008/142607
PCT Pub. Date: Nov. 27, 2008

(65) Prior Publication Data
US 2010/0151157 A1   Jun. 17, 2010

(30) Foreign Application Priority Data
May 17, 2007   (IT) .............................. MI2007A1002

(51) Int. Cl.
*C04B 18/06* (2006.01)
(52) U.S. Cl. ......... 264/115; 106/705; 106/710; 264/109
(58) Field of Classification Search ........................ None
See application file for complete search history.

(56) References Cited

U.S. PATENT DOCUMENTS

| 5,002,620 A * | 3/1991 | King ........................... 156/153 |
| 5,087,375 A * | 2/1992 | Weinwurm .................... 210/688 |
| 2005/0035480 A1* | 2/2005 | Bernabei ........................ 264/115 |
| 2006/0162618 A1* | 7/2006 | Bethani .......................... 106/705 |

FOREIGN PATENT DOCUMENTS

| EP | 1 382 584 | 1/2004 |
| JP | 2003-080106 | 3/2003 |
| JP | 2006-282430 | 10/2006 |
| WO | 02/11960 | 2/2002 |

OTHER PUBLICATIONS

Jelena Todororvic et al., "Treatment of MSWI Residues for Utilization as Secondary Construction Minerals: A Review of Methods", Minerals & Energy, vol. 20, No. 3-4, 2006, XP002505488, pp. 45-59, (abstract provided).
Luca Bertolini et al., "MSWI ashes as mineral additions in concrete", Cement and Concrete Research, vol. 34, No. 10, Oct. 1, 2004, XP004548728, Pergamon Press, Elmsford, NY, p. 1902 col. 2, line 8, p. 1903 col. 2, line 9, US, ISSN: 0008-8846, pp. 1899-1906.
J. Pera et al., Use of incineration bottom ash in concrete Cement and Concrete Research vol. 27, No. 1, 1997, pp. 1-5, XP002505490, (abstract provided).
International Search Report dated Jan. 13, 2009, from corresponding PCT application.

* cited by examiner

*Primary Examiner* — Mary F Theisen
(74) *Attorney, Agent, or Firm* — Young & Thompson

(57) ABSTRACT

A manufactured item for the building industry is disclosed, made mainly of bottom ash and/or debris coming from incineration processes of municipal solid waste or of waste which may be assimilated thereto and/or of RDF and of one or more binders. Such manufactured item may have the shape of small bricks, bricks, blocks, small blocks, kerbs, interlocking paving blocks, panels, tiles, prefabricated slabs, beams, elements for walls, modular building elements, indoor and outdoor cladding elements, blocks, rocks, supports. Moreover, a process for the manufacture of an item for the building industry is disclosed, from bottom ash and/or debris coming from incineration processes of municipal solid waste or of waste which may be assimilated thereto and/or of FDR wherein the ash and/or debris undergo an oxidation process of the amphoteric metals and mixed with a binder.

22 Claims, 1 Drawing Sheet

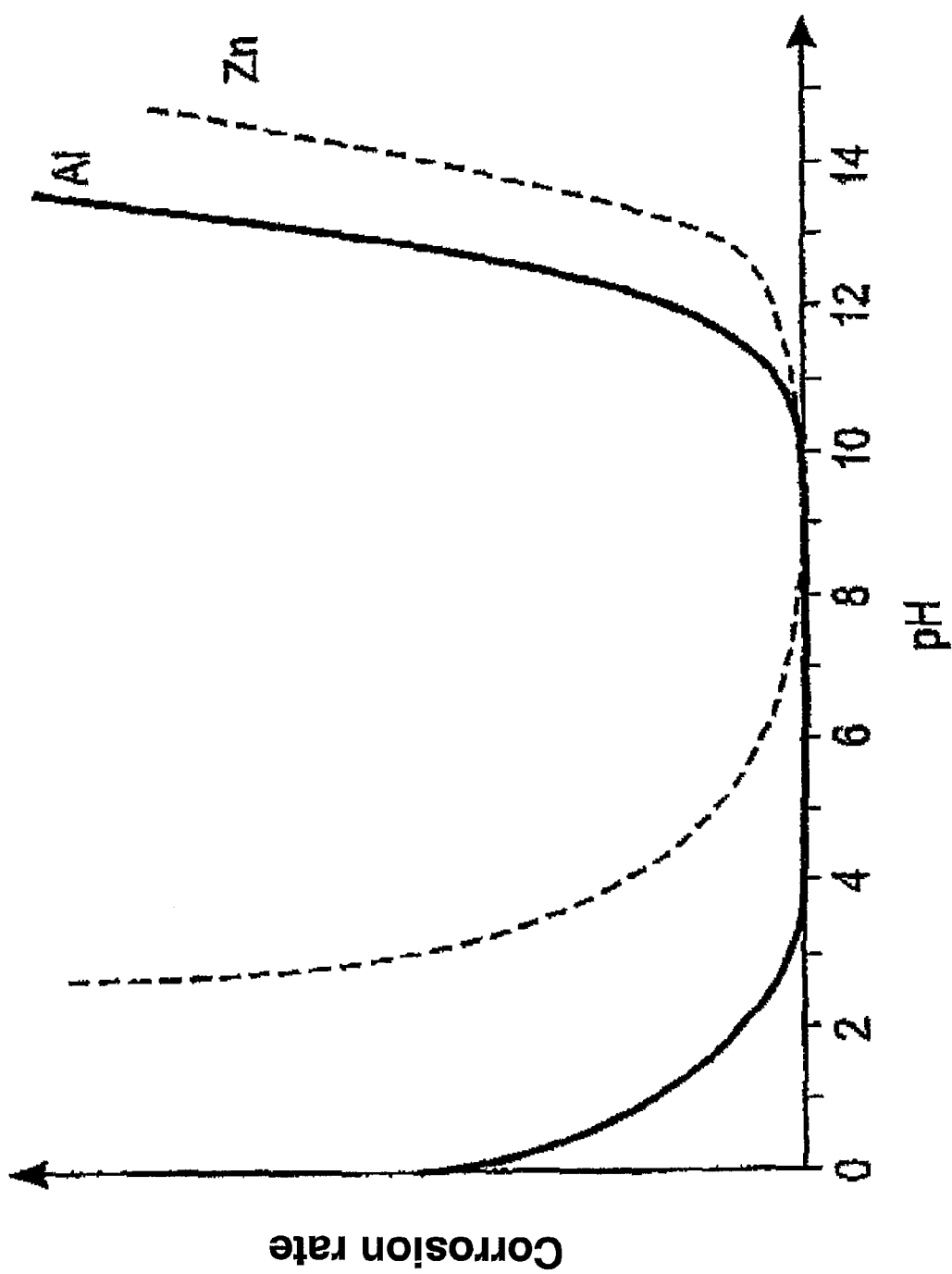

MANUFACTURED ITEM FOR THE BUILDING INDUSTRY

FIELD OF THE INVENTION

The present invention refers to a manufactured item for the building industry, consisting mostly of bottom ash and/or debris coming from incinerating processes of solid municipal or domestic waste, as well as to a process for the preparation thereof.

BACKGROUND OF THE INVENTION

Despite repeated appeals by the health and environmental authorities, the volume of municipal solid wastes—and of the waste which may be assimilated thereto—keeps growing, both because the well-being currently enjoyed in a part of the world entails generally growing consumptions, and because the very health authorities demand bulkier packages and often the disposable use of objects which have stringent hygienic requirements. Waste treatment is thereby a general problem and is particularly serious in the most highly industrialised countries, where space is at a premium.

So far, also due to issues of acceptance by the population towards the other disposal methods, waste has been mostly dumped in controlled landfill sites. Such system turns out to be increasingly inadequate, since it requires a continuous supply of space, preferably away from residential areas and entails various forms of environmental pollution; in particular, the liquids coming from waste decomposition and containing various toxic substances often leach into the underground aquifer.

The incineration of municipal solid waste, a practice which was once a source of various toxic gases, is now carried out with greater care, so as to produce virtually only carbon dioxide fumes and water, which over time originate also in a landfill site. The improvement of these processes, as well as their use for heat and/or electric energy generation, is a reality in the most advanced countries and will spread ever more.

At the end of the incineration process, between 20% and 30% of the fed waste remains in the form of incinerator bottom ash and/or debris (also known as IBA or bottom slag), essentially consisting of the non-combustible fractions and made up mainly of vitreous and/or ceramic materials, coming from the chemical-physical transformations of the combustion process, especially for the high temperatures (about 900° C.) reached in a correctly managed incinerator.

In Italy and in Europe, bottom ash and/or debris from the incineration of municipal solid waste and assimilated waste as well as from RDF (Refuse-Derived Fuel), are classified as non-hazardous waste by the so-called CER 190112 code. It may be that, according to domestic rules or specific authorisations, they are possibly mixed, also in the present invention, with other waste having the same origin.

Such bottom ash and/or debris are normally disposed of in a landfill site. Some suggestions have also been put forward to reuse the bottom ash and/or debris, the amount of which is definitely remarkable, with particular reference to the use thereof as material for the building industry.

Some studies show how bottom ash and/or debris, consisting mainly—as seen—of vitreous and ceramic components, have a pozzolanic potential. However, said bottom ash and/or debris, in addition to being granulometrically coarse and being rich in metals and various impurities, also contain non-negligible amounts of amphoteric metals, such as particularly aluminium and zinc which, in an alkaline environment and hence even more so in water-concrete mixtures, give rise to complex ions, with generation of gaseous hydrogen which produces expansion and, eventually, spoils completely the concrete product.

The same Applicant, in application PCT WO02/081 398, had suggested the wet milling and the aqueous suspension of bottom ash and/or debris to use them as additives for concrete and/or for concrete conglomerates. A use of this type is certainly interesting, but leads to the manufacturing of products of a rather limited added value.

EP 1 382 584 explained that, during the wet shredding of bottom ash and/or debris, corrosion by oxidation of the aluminium therein contained takes place and provided the preliminary shredding of bottom ash in aqueous suspension and the subsequent use for the manufacture of concrete. Later works, in the frame of university degree thesis, carried out or directed by the same authors of EP 1 382 584, whereto also the inventor of the present intention took part, highlighted how the simple wet shredding was often not sufficient to solve the problem of hydrogen building and they considered it suitable to increase pH by adding of all-but-negligible amounts of concrete (10-15% of the dry fraction), furthermore explicitly excluding resorting to other alkaline agents which might have determined in the concrete the well-known and deleterious reaction "alkali/aggregates". The addition of cement, on the contrary, was not a solution, because, in addition to implying significant costs items, while on the one hand it accelerated metal corrosion, on the other hand it also caused a phenomenon of cement curing and of reaction of the same with the shredded ash, so that firstly aqueous suspensions became even more difficult to be treated industrially, secondly, sort of lumps were generated, consisting of cement and ash, having very low mechanical resistance, due to the high amount of malm water. These friable cement/ash lumps were disaggregated by the lab cement mixers used in experiments, by which the mixing energy lied far above that, for example, of concrete-mixing equipment, where cement mixers are generally no longer used. These additions of cement, hence would have transferred to concrete manufacturers—the end users of these aqueous suspensions—two problems: even more unstable suspensions and cement/ash lumps to be disaggregated during the mixing phase.

Therefore, both the solutions set out above for reusing the bottom ash and/or debris provided the manufacture of a water suspension to be sold or used as such on the market of cement products, essentially for the manufacture of concrete. However, such a product:

it was not certifiable which addition of mineral ore of a pozzolanic nature, according to current standards on the subject of concrete (concrete, among other things, as known, being a material used for structural purposes, must undergo long and complex procedures to implement innovations);

it should have been sold or used by a very high number of concrete manufacturers and/or prefabs and/or concrete manufactured items (realistically over 20 for a medium-sized incinerator) and this would have been made even more critical by the fact that the manufacturing plants of these subjects are not equipped for receiving, in large amounts, water suspensions, but commonly receive products in the form of powder; moreover in the form of water suspension the products is partly unstable, since it is subject to decanting and sedimentation and this determines the need to maintain it in motion before use;

it presented a variability of the features, possibly linked to seasonal events, such as the variation of the features of the waste during the Christmas period, which would have affected downstream too large a number of companies, which would have hardly been willing to re-calibrate the mixture of concrete due to a very minor component;

it would have encountered difficulties in obtaining the authorisation for use, since it would have been—at least for a not exactly short period of time—a unicum on the market and the recovery process would have been completed by various third-party users making the entire recovery cycle and the degree of potential pollution in fact less traceable from an environmental point of view.

Moreover, these inventions and studies did not pick two absolutely essential elements to solve in a short time and industrially sustainable the problem of corrosion of amphoteric metals: the features of granulometric fineness which the product was to have and the opportunity to use alkali to accelerate the corrosion process of aluminium. As a matter of fact, they did not highlight the fact that the wet shredding was supposed to allow to reduce the size of all the particles below a certain threshold size and that, on the contrary, the average size or even the size below which 90% of the particles lay was not particularly important. As a matter of fact, the metallic aluminium found in bottom ash being very ductile, it is among the most difficult fractions to be shredded, so it is pointless to grind the ash to an average fineness of about 3 μm if then no attention is given to the fact that the granulometric curve has a 3% fraction lying in the range between 50 μm and 60 μm: the maximum size of the particles were and are essential.

It is highlighted how the granulometric characteristics reported both in WO02/081 398 and in EP 1 382 584 consider—more or less explicitly—as fundamental the achievement of a high granulometric fineness, however without picking the most important aspect i.e. the one concerning the maximum size of the particles. For example it is apparent how in a drawing reported in EP 1 382 584, while the average size of the wet-shredded particles are about 3 μm (high degree of fineness), there is about 3% of particles having a size ranging between 50 and 60 μm (larger size than that concerning dry shredding, which sets D50 about 4.5 μm and D98-D100 about 28-30 μm): the corrosion of these particles will certainly be far slower. This is extremely important because, if the main purpose of grinding is that of achieving a high average value, it is incorrect. Also WO02/081 398 pays no attention to the fineness in the sense of the maximum size of the particles, so much so that it even indicates only the values below which must be 90% of the particles. Due to the above, during the grinding and in those activities directly connected to the same, it is useful to set in place devices, to achieve the purpose of causing all the particles to be below a certain size.

Italian patent application no. MI93A 002650 shows the use of a ternary mixture of ash, calcium sulphate and lime for obtaining a manufactured item for the building industry having high mechanical resistance. The patent refers specifically to the ash which is left from the manufacture of coal and is particularly directed at fly ash (the lightest one). As regards the opportunity to use bottom ash (again generated in the combustion of coal), it is stated the opportunity that the same be used, but substantially as "aggregates" and not as a binding component. Moreover, in order to achieve these results, the starting point is a relatively even supply, such as the combustible coal of power plants, while nothing is said on completely different compositions, which are more variable and more complex, such as the charges of incenerators of solid municipal waste. It is hardly appropriate to highlight how various types of thermal processes exist and how the residues of each of these thermal processes depends on the chemical-physical characteristics of the incoming material, on the temperatures, on the combustion times, on the calorific value of the fuel, etc.

SUMMARY OF THE INVENTION

The drawbacks illustrated above are brilliantly solved by the present invention, consisting of a manufactured item for the building industry, made mainly of bottom ash and/or debris generated in incineration processes of municipal solid waste or of waste which may be assimilated thereto and/or of RDF and of one or more binders, characterised in that amphoteric metals contained in bottom ash and/or debris wherefrom the manufactured item is obtained have been substantially oxidised.

The present invention also refers to a process for the preparation of the above-said manufactured item for the building industry.

The enclosed drawing schematically shows the trend of the corrosion rate of aluminium and zinc according to pH.

A remarkable aspect of the present invention is highlighted, according whereto the bottom ash and/or debris are not intended for the manufacture of concrete and/or cement mixtures, but rather to the manufacture of manufactured items, using lime as "base" binder. In the manufacture of concrete and/or cement mixtures, in the course of a few hours extremely high pH values may be reached, generally lying between 13.3 and 13.7 depending on the type of cement. This leads to an exponential increase of the corrosion rate of aluminium and, should there still be aluminium fractions which are not completely corroded, the corrosion of the same would experience a swift acceleration, with the already described effects. On the contrary, in a lime-base mixture such as the ones identified in the present invention, the pH tends to remain at values around 12-12.7 hence not unlike values which may be easily achieved by the addition of small amounts of alkali, so that no acceleration is triggered. For such purpose, see also the accompanying drawing, which shows the schematic trend of the corrosion rate of aluminium and zinc depending on pH.

Finally, it must be said that any possible residual expansion phenomena, due to the presence of non-completely corroded amphoteric metals as well as expansion phenomena linked to the use of binders such as, for example, CaO, may be safely sustained and controlled in plants dedicated to the manufacture of manufactured items using as main component bottom ash and/or debris, while they would be unmanageable and unsustainable if the product was intended for a large number of clients.

DETAILED DESCRIPTION OF THE INVENTION

The manufactured item for the building industry according to the present invention can take various shapes. Particularly preferred shapes are small bricks, bricks, blocks, small blocks, kerbs, concrete interlocking paving blocks, panels, tiles, sheets, beams, elements for walls, modular building elements, indoor and outdoor cladding elements, rocks, supports and others.

The manufactured items for the building industry according to the present invention may be manufactured obtaining a very large variety of properties and mechanical resistances. In terms of mechanical resistances to compression, manufactured items may be accomplished ranging from 15 kg/cm$^2$ to over 600 kg/cm$^2$. Generally, manufactured items withstanding between 25 and 500 kg/cm$^2$ are obtained, but even more advanced performances are possible, by suitably adjusting preparation parameters.

As concerns the fields of application of the manufactured item according to the present invention, they are in no way limited, since it is possible to use the manufactured item for building and maintaining dwellings, offices, industrial warehouses, sports buildings, barracks, railway foundations and stations, carriageways, viaducts, tunnels, subways, bunkers, nuclear shelters, ports, temporary structures and others.

As concerns the preparation of the manufactured item according to the present invention, the first "key" step is the wet shredding. It may also be carried out in multiple steps and with multiple, different apparatuses. Before wet grinding, it is useful to carry out some preliminary operations, consisting essentially in separating (as far as possible) the undesired fractions, which operations generally consist of:

screening to remove coarse fractions;
magnetic separation; and
separation of the paramagnetic metals.

Based on a series of experiments carried out, the separation of the above paramagnetic fractions—carried out with any known method—allows to reduce, but not to remove completely—the presence of amphoteric metals. Furthermore it is possible to cause wet grinding to be preceded by a dry pre-grinding (even though bottom ash and/or debris generally have a humidity content in the order of magnitude of 10%). Preferably, from the step of wet grinding, but possibly also later, alkali are added to the suspension, so as to ease the full oxidation of the amphoteric metals contained in the bottom ash and/or debris. The pH is raised to sufficiently high levels, even though not very high: generally, to a pH value ranging between 11.8 and 12.8, so as to favour the formation of hydroxyaluminates and hydroxyzincates which remove from the suspension all the metallic contents. Any strong base is suitable for use for this operation. Preferred bases are NaOH, KOH, $Ca(OH)_2$, process water and wash water coming from manufacturing processes of cement products (for example manufacture of fibre-cement), sodium silicate, bases coming from other industrial activities (aluminium decaping), etc. Such a treatment would be deleterious if one intended to manufacture concrete or derived products, since the high content of alkali is one of the most serious and uncontrollable causes of concrete degradation due to the well-known "alkali/aggregate" reaction, which causes harmful expansions and bulges.

For the purpose of optimising the present process, wet grinding must lead to the accomplishment of a material which has not so much a particularly small average size of the particles—which fact furthermore impacts significantly on water demand—but all smaller than a certain threshold size. In order to obtain this result the following devices may be employed:

grinding is accomplished by means of not too small grinding bodies and hence not so much with microsphere mills where the size of the microspheres are generally about 1-3 mm, but rather by means of ball mills (or equivalent machines), with grinding bodies generally larger than 10 mm or ball mills with a size in the order of magnitude of 3-7 mm (this last type of grinding must necessarily be preceded by another grinding step for a first reduction of the size of the same) or with both machines in succession;

after grinding a separation by filtering step, by sedimentation or other, of the coarser fractions is carried out; these coarser fractions, are subsequently preferably reintroduced in the cycle to undergo further grinding and for the desired fineness values to be achieved.

In terms of fineness it is necessary for all particles to be of a size smaller than 70 µm. Advantageous results are achieved when all the particles are of a size below 60 µm; it is preferable for the particles to be all smaller than 50 µm, more preferably smaller than 40 µm, even more preferably smaller than 30 µm, in the most preferred way they are smaller than 20 µm: in the tests carried out, the corrosion rate was clearly linked to the maximum size below which all the particles lay.

The choice hence to opt for deep grinding, for the addition of alkali or for longer waiting times will hence depend on local conditions, grinding costs (electric energy), available raw materials, available space.

Possibly, should the bottom ash and/or debris have a content of polluting metals larger than the acceptable amount, it is possible to subject the outgoing suspension from the corrosion step to electrochemical purification, for example by electrolysis, so as to remove heavy metals. The hypothesis of subjecting bottom ash or debris to electrochemical purification has already been put forward in other studies, but there are two substantial differences in the case of the present invention: the product would be found finely ground and in water suspension, i.e. in completely different conditions from those of a coarse and simply damp product.

After grinding and before using the bottom ash and/or debris for the manufacture of items, a sufficiently long waiting time must be observed to allow a sufficient corrosion of the amphoteric metals.

Before, during or after this last step it is hence possible to proceed to an action aimed at reducing the water of the suspension for the purpose of consequently reducing the water/ash ratio for the purpose of the performances of the finished manufactured item which largely depend on the water contents. The removal of water may be accomplished in various known ways, among which, for example, employing filter presses, centrifugal machines, belt presses, centrifugal cleaners and the like. A slurry is thereby obtained with the desired water/ash contents which may also be stored before the subsequent processing steps, intended to obtain the manufactured item.

When one wishes to actually manufacture the item and after having achieved a satisfactory level of corrosion of the amphoteric metals, the suspension or the slurry prepared as seen above are mixed by means of adequate mixers, depending on the workability thereof, with one or more binders. As binder it is preferred $Ca(OH)_2$ or products capable of converting into $Ca(OH)_2$ by reaction with water, which form with the ash a real hydraulic binder. Particularly preferred is CaO which, despite being more expensive, comprises a nearly double amount of calcium the weight being equal and can help reduce the overall maim water.

Advantageously, the ratio between $Ca(OH)_2$ (or equivalent) and ash varies between 1:6 and 1:2 by weight, preferably between 1:5 and 1:3 by weight.

In an extremely advantageous way for the purpose of the properties of the final manufactured item, calcium sulphate may possibly also be added to this mixture. There are no hydration limits for the calcium sulphate to be employed. It is preferred to use bi-hydrated calcium sulphate which is the result of other industrial processes, such as the calcium sulphate coming from desulphuration processes, for example of the coal coming from thermal power plants. It may also be resorted to the scagliola ($CaSO_4.0.5H_2O$) for its low contents of water and its ready availability. The addition of calcium sulphate, together with a high-temperature steam curing, leads to the forming of a type of very well crystallized ettringite ($3CaO.Al_2O_3.3CaSO_4.32H_2O$) (different from the one much better known for its negative effects and responsible for concrete deterioration) which imparts to the manufactured item particularly good mechanical properties. The amount of calcium sulphate which can be converted to ettringite essentially depends on the contents of aluminium oxide which, in bottom ash and/or debris, may generally vary between 5% and 20% of the dry residue. Of course, also depending on the type of manufactured items and on the use they are intended for, it may be useful to dose the addition of calcium sulphate, avoiding excess calcium sulphate which does not convert to ettringite, which may give rise to the well-known negative effects.

The composition may contain, in weight on the dry portion, ash between 50 and 87%, $CaSO_4.2H_2O$ between 3 and 34% and $Ca(OH)_2$ between 10 and 35%; a preferred composition contains, in weight of the dry portion, ash between 50 and 85%, $CaSO_4.2H_2O$ between 3 and 20% and $Ca(OH)_2$ between 12 and 32%. In both cases, if calcium sulphate or lime with a different hydration is used, the amount will have to contain the same amount of reactive component.

Other binders may also be used, such as cement or ground blast furnace slag and this depends on the types of manufactured items which one intends to manufacture. The added binders may be added in an amount below 50% of the weight of the total binders (whereto bottom ash and/or debris belong to, after having been treated). Advantageously, the added binders are less than 30% of the total. In the most preferred way, less than 20%. As can be seen, it is possible to produce manufactured items which comprise a majority of bottom ash and/or debris. In this step, as from the grinding step, it may be useful to use those reactives and those devices used for improving the properties of inertisation or chemical fixing—according to the known knowledge—with respect to any polluting agents found.

Once accomplished the mixing of the added binders and ash, it is proceeded to the forming of the manufactured item. This may be done in the most diverse ways known in the art. The manufactured item may be moulded on with blockmaking machines, keeping a low water/solids ratio, so as to allow good cohesion and stability of the moulded product; it may be extruded; it may undergo a casting process in footing forms or caissons; it may be cast or moulded in large caissons and subsequently cut to the desired size according to the widespread technologies for the manufacture of cellular items sold under the commercial names of Iperblock, Gasbeton and Ytong. In some cases, it may also be necessary to add aluminium in powder or in paste or other additives with ventilating functions and this will be accomplished with known products and in controlled amounts, so as to obtain the desired effects.

The formed manufactured item at this point must necessarily undergo a forced steam curing cycle. Such curing cycle is highly recommended for two main reasons:

in case of use of lime only, for accelerating a curing process (lime/pozzuolana) which, would otherwise complete in a very long time of at least 50-60 days;

in case of use of calcium sulphate also, for avoiding the forming of the ettringite form which would have expansive and negative effects instead of improving performances.

The first step of the cycle of curing is a "rest" step: the formed manufactured item is left for a time period ranging between 0 and 24 hours without undergoing any process, depending on the binders used and on the features of the manufactured item. After this step, the manufactured item undergoes a forced steam curing. During this step, the temperature is kept mostly at least at 35° C., preferably at least at 45° C., most preferably at least at 55° C.

Depending on the type of manufactured items which one wants to accomplish, it is also possible to exceed 100° C. and carry out an autoclave curing with high increases of the performances. This is highly recommended for the production of cellular manufactured items.

Such cycles last from 5 to 48 hours, preferably with a pre-heating step and a step in which the suitable temperature increases.

At the end of the curing, the manufactured item must undergo an adequate cooling step to avoid thermal shocks.

It is also possible that, in certain cases, a subsequent open-air curing step is required. In this case, it is not recommended to keep the manufactured item in contact with water, or in environments saturated with humidity, unlike what occurs for concrete. As a matter of fact, the wet curing on manufactured items where calcium sulphate had been used as binder has sometimes originated cracks which, on the contrary, did not take place where the step subsequent to steam curing had been effected exposed to the air.

Within the frame of material and energy recovery, it may be interesting to build the plant for the production of manufactured items in the proximity of the incinerating plant, so as to take advantage of the waste heat coming from the incenerators for the curing step and for further optimising the process and the environmental balance of the activity. The accomplished manufactured items may undergo a grinding process after curing, to obtain granulates.

As can be seen, the present invention allows to produce manufactured items, consisting even up to 80 wt %-90 wt % of bottom ash and/or debris, with respect to a value which could presumably be of 2-5 wt % for concrete manufactured items, where bottom ash and/or debris are used as additives.

It is pointed out how it may be useful, even from the initial grinding steps, depending on the types of manufactured item which one intends to produce and to optimise all the process steps, to use additives such as, for example, water reducers (fluidisants-superfluidisants), ventilating agents, accelerating agents, retardants, water-repellent agents, aluminium, resins, fibres or other products which are habitually used with cement materials and in general all those materials which are already normally used in cement products.

Moreover, the mixes of binary, ternary or other binders, consisting of the bottom ash and/or debris after the treatment (which always make up the prevailing portion), of lime, calcium sulphate and possibly of other agents, may be used as "main binding matrix", for the production of other manufactured items, without departing from the scope of the present invention.

The manufactured item according to the present invention may further undergo a surface treatment of a type known per se, for example with water-repellent and/or waterproofing agents and/or with resins.

Water reduction may be effected even after mixing with the added binders.

It is evident that the production of the manufactured item according to the present invention may be accomplished by separate steps of which, for example, the preliminary ones, up to the reduction of the water contents, may be carried out in a plant and the subsequent ones in another plant.

The present invention will now be further illustrated based on some experiments. The experiments are designed to verify how the aluminium corrosion process may be accelerated and to verify which manufactured items may be obtained starting from bottom ash and/or debris.

It was thereby verified that the properties of the manufactured items may be modulated, in particular mechanical resistance may be modulated. The features are mainly conditioned by the water/binders ratio, by the features of the binders, by the fineness of the ash, by the particular method of preparation of the manufactured item, by the compacting pressure of the manufactured item, by the curing conditions, by the density of the finished product, by the water/solids ratio.

In the following table the results are reported which were obtained producing manufactured items starting from eight different types of bottom ash and/or debris. The working procedure has been the following: 1) the ferromagnetic fractions of the bottom ash and/or debris have been manually removed using a magnet; 2) the bottom ash and/or debris have been preliminarily dry-ground; 3) the bottom ash and/or debris have been wet-ground in a small mill; 4) with a laser granulometer the fineness of the aqueous suspension has been verified (all the particles, in all grinding processes, had a maximum size ranging between 15 and 65 μm); 5) the suspension was left to "rest" to allow aluminium corrosion; 6) tests have been carried out with small fractions, mixing them with $Ca(OH)_2$ and it has been observed if expansion occurred. With the left-over suspension various mixes have been prepared. Some have been prepared without changing the suspension; others have been partially dehydrated. Corrosion was obtained by various methods: in some cases waiting has simple been adopted, in others bases have been added (process water coming from a fiber-cement manufacturing plant).

The experiments have been carried out with limited apparatuses. Not particularly powerful cement mixers have been used, so it has not been possible to further reduce the water contents. Moreover, since no adequate machine was available for fibro-compressing the prisms, in the cases in which the consistency of the material was rigid, it has been proceeded to manual beating. Such manual beating allows to compact materials having a rigid consistency, even though in a much less effective way than with industrial machines. Moreover, this has determined a limit in the results reliability due to the operator's ability and accuracy in manually compacting the prisms. Despite other tools allowing better performances, the results are positively significant and give the idea of the huge potential.

Due to the impossibility of carrying out an even pressing, as set forth above, it has been widely resorted to water reducers, (probably not necessary or minimally necessary in an industrial manufacturing process) which had, however, the advantage of allowing greater fluidity and, hence, in tests with comparison purposes, of allowing us a comparison.

| dry ash | % | Ca(OH)2 | CaO | CaSO4·2H2O | CaSO4·0.5H2O | cem I | cem II-B/L | H2O total | fluidisant | Aluminum | aerating agent | consistency | wet weight | 48 hours after steam cycle 16-24 h | after 7 days | after 28 days | after autoclave cycle | ash type |
|---|---|---|---|---|---|---|---|---|---|---|---|---|---|---|---|---|---|---|
| 1004 | 55.6 | 261.6 | | 540 | | | | 932 | 36 | | | plastic-gluey | 434 | 29.7 | 34.4 | 38.1 | | 1 |
| 1336 | 55.7 | 344 | | 720 | | | | 1236 | 48 | | | plastic-gluey | 427 | 30.6 | 36.8 | 40.6 | | 2 |
| 1002 | 55.7 | 258 | | 540 | | | | 825 | 36 | | | plastic-gluey | 436 | 37.8 | 42.2 | 45.2 | | 2 |
| 1002 | 55.7 | 258 | | 540 | | | | 927 | 36 | | | plastic-gluey | 438 | 29.4 | 32.3 | 35.6 | | 2 |
| 1336 | 55.7 | 344 | | 720 | | | | 1100 | | | | plastic-gluey | 433 | 32.6 | 34.5 | 38.9 | | 2 |
| 1002 | 55.7 | 798 | | | | | | 879 | | | | plastic-gluey | 425 | 15.1 | 17.3 | 19.4 | | 1 |
| 1050 | 77.8 | 300 | | | | | | 853.1 | 27 | | | plastic-gluey | | 23.2 | 26 | 28.6 | | 1 |
| 1002 | 55.7 | 258 | | 540 | | | | 576 | 36 | | | plastic-gluey | 454 | 39.2 | 42.1 | 45.8 | | 2 |
| 1050 | 77.8 | 300 | | | | | | 1290 | 18 | | | rigid, gluey | | 4.9 | 5.8 | 6.3 | | 2 |
| 1050 | 77.8 | 300 | | | | | | 1290 | 18 | 1.8 | | fluid-viscous | | | | | 2.4 | 1 |
| 1050 | 77.8 | 300 | | | | | | 825 | | 1.8 | | fluid-viscous | | | | | 3.4 | 2 |
| 1050 | 77.8 | 300 | | | | | | 825 | | 1.8 | | fluid-viscous | | | | | 3.5 | 1 |
| 1309 | 87.8 | | 182 | | | | | 367 | 39 | | | rigid | 490 | 29.3 | 32.7 | 36.7 | | 2 |
| 1309 | 87.9 | | 181 | | | | | 340 | 31 | | | rigid | 499 | 31.7 | 37.5 | 42.2 | | 2 |
| 1050 | 77.8 | 300 | | | | | | 825 | 27 | | | fluid-viscous | | | | | 2.9 | 2 |
| 1050 | 77.8 | 300 | | | | | | 900 | | 1.3 | | fluid-viscous | | | | 0 | 3.9 | 2 |
| 1050 | 77.8 | 300 | | | | | | 900 | | 1.05 | | fluid-viscous | | | | 0 | 3.2 | 1 |
| 1050 | 77.8 | 300 | | | | | | 900 | | 1.05 | | fluid-viscous | | | | 0 | 3.2 | 2 |
| 1200 | 78.2 | 334 | | | | | | 450 | 8 | 1.05 | | plastic | 398 | | | 11.5 | 20.7 | 3 |
| 900 | 77.8 | 257.1 | | | | | | 771.5 | | 0.9 | | fluid-viscous | 315 | | | 1.4 | 3 | 3 |
| 900 | 77.8 | 257.1 | | | | | | 588 | 8 | 0.9 | | fluid-viscous | 318 | 2.4 | 2.7 | 2.6 | 5.1 | 3 |
| 1125 | 71.4 | 450 | | | | | | 786 | | 0.9 | | plastic | 395 | 2.5 | 3.1 | 3.1 | 6.8 | 3 |
| 1050 | 77.8 | 360 | | | | | | 810 | | | | plastic | 390 | 3.2 | 3.7 | 3.3 | 7 | 3 |
| 1350 | 81.8 | 360 | | | | | | 825 | | | | plastic | 382 | 7.6 | 3.7 | 4 | 6.6 | 3 |
| 1260 | 77.8 | 360 | | | | 30 | | 486 | 15 | | | plastic-gluey | 418 | 4.8 | 8.7 | 9.5 | 15.9 | 3 |
| 1260 | 77.8 | 360 | | | | 60 | | 648 | 18 | | | plastic-gluey | 418 | 2.7 | 5.1 | 5.7 | 10.3 | 3 |
| 1260 | 77.8 | 360 | | | | | | 810 | | | | plastic | 394 | 3.1 | 3.6 | 4 | 7.6 | 3 |
| 890 | 84.5 | | 133 | | | | | 620 | 15 | 0.5 | | fluid-viscous | 320 | 3.9 | 3.7 | 4.9 | 12.4 | 3 |
| 900 | 82.3 | | 133 | | | | | 620 | 18 | 0.5 | | fluid-viscous | 301 | 28.6 | 4.7 | 5.8 | 45.8 | 2 |
| 1050 | 77.8 | 300 | | | | | | 405 | | | | rigid | 462 | 20.1 | 30.7 | 34.9 | 33.6 | 2 |
| 1050 | 77.8 | 300 | | 669 | | | | 675 | 14 | | | plastic-gluey | 416 | 19.8 | 24.5 | 27.7 | 34.2 | 2 |
| 1350 | 81.8 | 300 | | | | | | 825 | 21 | | | plastic-gluey | 416 | 33.1 | 22.1 | 25.4 | 15.6 | 2 |
| 1400 | 77.8 | 400 | | | | | | 900 | 14 | | | plastic-gluey | | 6.4 | 7.6 | 8 | | 4 |
| 1050 | 52.0 | 300 | | | 60 | | | 612.3 | 18 | | | plastic | 490 | 35.6 | 44.7 | 48.2 | | 5 |
| 1050 | 88.8 | 300 | | 669 | 180 | | | 508.5 | 21 | | | semirigid/rigid | 499 | 39.6 | 47.6 | 52 | | 5 |
| 1000 | 71.4 | 200 | | | | | | 360 | 14 | | | rigid | 497 | 21.4 | 23.3 | 26.7 | | 2 |
| 1050 | 52.0 | 300 | | | 60 | | | 750 | 21 | | | plastic | | | 38.2 | 41.9 | | 2 |
| 1350 | 81.8 | 300 | | | | | | 180 | ? | | | RIGID | | | 52.9 | 56.8 | | 2 |
| 421 | 59.5 | 100 | | | | | 127 | 242 | ? | | | plastic | | | 11.9 | 13.2 | | 4 |
| 375.9 | 79.0 | 100 | | | | | | 699 | 15 | | yes | SEMIRIGID | 468 | 9.7 | 37.9 | 41.2 | | 5 |
| 1050 | 53.8 | 300 | | | | 200 | | 900 | 19.5 | | yes | fluid-plastic | 401 | 31.1 | 11.7 | 12.9 | | 5 |
| 1050 | 53.8 | 300 | | 600 | 63 | 300 | | 1326 | 19.5 | | yes | fluid-plastic | 381 | 10.1 | 12.9 | 14.2 | | 5 |
| 1050 | 61.3 | 300 | | 600 | | 300 | | 720 | 18 | | yes | rigid | 459 | 22.4 | 25.8 | 29.9 | | 5 |
| 1050 | 63.6 | 300 | | 600 | | | | | | | | | | 10.8 | | | | 5 |

-continued

| | | | | | Composition | | | | | | | | | | Mechanical resistance to compression in MPa | | | | |
|---|---|---|---|---|---|---|---|---|---|---|---|---|---|---|---|---|---|---|---|---|
| | | | | | | | | | | | | | | | 48 hours after | | | | after | |
| dry ash | % | Ca(OH)2 | CaO | CaSO4·2H2O | CaSO4·0.5H2O | cem I | cem II-B/L | H2O total | fluidisant | Aluminum | aerating agent | consistency | wet weight | steam cycle 16-24 h | after 7 days | after 28 days | autoclave cycle | ash type |
| 1050 | 63.6 | 300 | | | | 300 | | 720 | 24 | | yes | rigid | 456 | 25.6 | 28.9 | 30.2 | | 5 |
| 1267 | 88.0 | | 173 | | | | | 354 | | | | plastic | 453 | 12.5 | 14 | 15.3 | | 6 |
| 1050 | 54.7 | | 150 | 720 | | | | 572.1 | 27 | | | rigid | 479 | 33.1 | 40.4 | 43 | | 5 |
| 1050 | 61.4 | | 150 | 510 | | | | 572.1 | 27 | | | rigid | 470 | 34.6 | 41.2 | 45.9 | | 5 |
| 1050 | 70.0 | | 150 | 300 | | | | 675 | 27 | | | rigid | 462 | 38.6 | 0 | 41.8 | | 5 |
| 1050 | 60.5 | | 150 | 510 | | | | 700.5 | 18 | | | plastic/rigid | 454 | 28.5 | 33.1 | 35.4 | | 5 |
| 1263 | 58.2 | | 176 | 225 | | | | 528 | 42 | | | RIGID | | | 521 | 571 | | 5 |
| 1056 | 57.8 | 300 | | 80 | | 398 | | 1070 | 26 | | | fluid | 390 | 445 | 199 | 219 | | 5 |
| 1266 | 61.2 | | 294 | 94 | | 356 | | 1284 | 30 | | 8 | fluid | 379 | 178 | 215 | 237 | | 5 |
| 1260 | 68.3 | 315 | 353 | 270 | | | | 810 | 54 | | 16 | fluid | 435 | 192 | 335 | 360 | | 5 |
| 930 | 63.4 | | 235 | 63 | | | | 860 | 20 | 1 | 3 | fluid-viscous | 240 | 278 | 51 | 56 | | 5 |
| 922 | 70.5 | | 121 | 265 | | | | 900 | 20 | 0.6 | | fluid-viscous | 269 | 44 | 67 | 73 | | 5 |
| 1050 | 61.4 | | 150 | 510 | | | | 675 | 18 | | | plastic/rigid | 456 | 57 | 32.6 | 37.2 | | 5 |
| 1050 | 62.1 | | 131 | 510 | | | | 656 | 18 | | | plastic/rigid | 460 | 29.8 | 33.7 | 37.6 | | 5 |
| 1050 | 62.6 | | 117 | 510 | | | | 642 | 15 | | | plastic/rigid | 459 | 26.1 | 31.6 | 37.6 | | 5 |
| 1050 | 63.1 | | 105 | 510 | | | | 630 | 18 | | | plastic/rigid | 466 | 25.3 | 26.1 | 29.8 | | 5 |
| 1050 | 71.8 | | 150 | | 262.5 | | | 675 | 18 | | | plastic/rigid | 461 | 21.8 | 34.7 | 36.2 | | 5 |
| 1050 | 67.3 | | 150 | | 360 | | | 675 | 18 | | | rigid | 459 | 32.2 | 38.4 | 46.5 | | 5 |
| 1000 | 61.4 | | 143 | 486 | | | | 545 | 26 | | | plastic/rigid | 471 | 27.1 | 41.8 | 44.7 | | 5 |
| 1000 | 54.7 | | 143 | 686 | | | | 545 | 26 | | | plastic/rigid | 472 | 39.1 | 45.4 | 47.2 | | 5 |
| 800 | 50.9 | 286 | | 486 | | | | 422 | 35 | | | rigid | 468 | 41.2 | 42.3 | 46.8 | | 5 |
| 1000 | 61.3 | | | | 60 | 286 | | 1070 | 18.6 | | yes | fluid-plastic | 408 | 37.6 | 16.3 | 17.2 | | 5 |
| 1000 | 74.3 | 286 | | | 60 | | | 1166 | 18.6 | | yes | fluid-plastic | 371 | 15.7 | 6.4 | 7 | | 5 |
| 1056 | 61.8 | | 294 | | 63 | 297 | | 1326 | 25.5 | 1.2 | | fluid | | 5.6 | 6.1 | 6.6 | | 5 |
| 633 | 61.7 | | 176 | | 37.8 | 178.2 | | 648 | 15.5 | 0.78 | | fluid | | 5.5 | 8.2 | 8.8 | | 5 |
| 528 | 61.8 | | 147 | | 31.5 | 148.5 | | 1146 | 12.9 | | 4.5 | fluid-viscous | 300 | 7 | 2.7 | 3 | | 5 |
| 528 | 61.8 | | 147 | | 31.5 | 148.5 | | 640 | 15.5 | | 9 | fluid | 394 | 2.3 | 20.1 | 22.5 | | 5 |
| 633 | 61.7 | | 176 | | 37.8 | 178.2 | | 648 | 20 | | 3.6 | fluid | 383.8 | 18 | 21.3 | 24.8 | | 5 |
| 844 | 52.9 | 235.2 | | 517.4 | | | | 897 | | | 6 | fluid-viscous | 387 | 18.9 | 15.4 | 17.8 | | 5 |
| 844 | 52.9 | 235.2 | | 517.4 | | | | 800 | | | 4.6 | fluid-viscous | 394 | 11.1 | 17.9 | 21.9 | | 5 |
| 844 | 62.0 | | 118 | 400 | | | | 740 | 20 | | 5.1 | fluid-viscous | 396 | 12.3 | 22.2 | 26.5 | | 5 |
| 1050 | 52.0 | 300 | | 669 | | | | 790.5 | 36 | | | plastic | 422 | 13.1 | 32.5 | 36.3 | | 5 |
| 844 | 61.7 | | 235 | | 50.4 | 237.6 | | 1061 | 20 | 0.6 | | fluid-viscous | 297 | 22.4 | 5.6 | 6.4 | | 5 |
| 844 | 61.7 | | 235 | | 50.4 | 237.6 | | 864 | 20 | 1.04 | | fluid-viscous | 279 | 4.1 | 5.8 | 6.8 | | 5 |
| 844 | 62.0 | | 118 | 400 | | | | 822.6 | 20 | 0.8 | | fluid-viscous | 302 | 3.9 | 5.9 | 7 | | 5 |
| 1309 | 88.0 | | 179 | | | | | 367 | 39 | | | rgid | 498 | 3.6 | 37.7 | 40.7 | | 5 |
| 1050 | 65.1 | 300 | | | 262.5 | | | 686.3 | 45 | | 3 | fluid-viscous | 427 | 31.8 | 38.6 | 41 | | 5 |
| 1050 | 68.6 | 300 | | | 180 | | | 750 | 45 | | 3 | fluid-viscous | 397 | 33.7 | 14.1 | 17.2 | | 5 |
| 840 | 70.4 | 210 | | | 144 | | | 543 | 36 | | 2.4 | fluid-viscous | 441 | 11.5 | 33.9 | 36.7 | | 5 |
| 945 | 76.1 | 135 | | | 162 | | | 573 | 36 | | 2.4 | fluid-viscous | 441 | 28.6 | 37.8 | 41 | | 5 |
| 945 | 71.8 | 135 | | | 236 | | | 563.4 | 41 | | 2.7 | fluid-viscous | 443 | 30.4 | 35.8 | 38.9 | | 5 |
| 840 | 66.7 | 240 | | | 180 | | | 600 | 36 | | 4.5 | fluid-viscous | 430 | 30.1 | 32.1 | 35.4 | | 5 |
| 945 | 76.1 | | 135 | | 162 | | | 573 | 36 | | 2.7 | fluid-viscous | 440 | 27.3 | 36.8 | 43 | | 5 |
| 945 | 71.8 | | 135 | | 162 | | | 529.5 | 40.5 | | 2.7 | fluid-viscous | 461 | 32.9 | 49.6 | 54.7 | | 5 |
| 1050 | 77.1 | | 131 | | 180 | | | 525 | 60 | | 3 | fluid-viscous | 459 | 41.8 | 47.9 | 52.5 | | 5 |

-continued

| dry ash | % | Ca(OH)2 | CaO | CaSO4·2H2O | CaSO4·0.5H2O | cem I | cem II-B/L | H2O total | fluidisant | Aluminum | aerating agent | consistency | wet weight | 48 hours after steam cycle 16-24 h | after 7 days | after 28 days | after autoclave cycle | ash type |
|---|---|---|---|---|---|---|---|---|---|---|---|---|---|---|---|---|---|---|
| 844 | 61.7 | | 235 | | 50.4 | 237.6 | | 1061 | 20 | 0.7 | | fluid-viscous | 272 | 4.6 | 5.3 | 5.8 | | 5 |
| 844 | 71.8 | | 120 | | 212 | | | 900 | 20 | 0.60 | | fluid-viscous | 274 | 5.1 | 5.8 | 6.3 | | 5 |
| 548.6 | 66.7 | | 78.4 | | 195 | | | 611 | 13.2 | 0.38 | | fluid-viscous | 296 | 5.1 | 5.9 | 6.4 | | 5 |
| 844 | 66.8 | | 120 | | 300 | | | 940 | 20 | | 6 | fluid-viscous | 352 | 9.7 | 11.3 | 12.8 | | 5 |
| 844 | 61.7 | | 235 | | 50.4 | 237.6 | | 864 | 22 | 1.05 | | fluid-viscous | 246 | 4.6 | 5.2 | 5.7 | | 5 |
| 844 | 71.7 | | 121 | | 212 | | | 900 | 20 | 0.6 | | fluid-viscous | 275 | 5.8 | 6.7 | 7.6 | | 5 |
| 844 | 61.7 | | 235 | | 50.4 | 237.6 | | 864 | 20 | | 12.8 | fluid-viscous | 352 | 14.7 | 16.6 | 18.1 | | 7 |
| 1200 | 88.9 | | 150 | | | | | 375 | 100 | | | fluid-viscous | 472 | 14.1 | 19.8 | 24.7 | | 7 |
| 844 | 61.7 | | 235 | | 50.4 | | | 740 | 20 | 1.04 | | fluid-viscous | 373 | 11.5 | 13.2 | 14.8 | | 7 |
| 844 | 78.1 | 236 | | | | | | 720 | 20 | | | fluid-viscous | 380 | 9.5 | 11.4 | 12.6 | | 7 |
| 988 | 65.1 | 282 | | | 248 | | | 1062 | 4.2 | | | fluid-viscous | | 12.5 | 13.9 | 14.7 | | 7 |
| 988 | 65.1 | 282 | | | 248 | | | 1062 | 4.2 | | | fluid-viscous | | 14.3 | 15.7 | 16.7 | | 7 |
| 988 | 65.1 | 282 | | | 248 | | | 876 | 44 | | | fluid-viscous | | 20.6 | 22.8 | 24.1 | | 8 |
| 1172.8 | 79.8 | 234 | | | 82 | | | 526 | 36 | | | fluid-viscous | | 27.4 | 29.5 | 33.7 | | 7 |
| 988 | 77.8 | 282 | | | | | | 876 | 11.6 | | | fluid-viscous | | 5.5 | 7.1 | 7.5 | | 7 |
| 988 | 71.5 | 394 | | | | | | 1179 | 22 | | | fluid-viscous | | 6 | 7.7 | 8.4 | | 7 |
| 1265 | 76.3 | 394 | | | | | | 1179 | 22 | | | fluid-viscous | | 5.1 | 7.5 | 8.3 | | 7 |
| 988 | 87.5 | | 141 | | | | | 876 | 10 | | | fluid-viscous | | 4.4 | 4.8 | 5.3 | | 7 |
| 1215.7 | 88.5 | | 158 | | | | | 473.6 | 30 | | | fluid-viscous | | 9.8 | 10.7 | 11.6 | | 8 |
| 1215.7 | 88.5 | | 158 | | | | | 473.6 | 30 | | | fluid-viscous | | 4.7 | 12.4 | 15.1 | | 8 |
| 1225.8 | 90.1 | | 135 | | | | | 438 | 30 | | | fluid-viscous | | 4.1 | 9.9 | 12.8 | | 8 |
| 1309 | 87.4 | | 188 | | | | | 400 | 18 | | | rigid | 475 | 20.4 | 21.3 | 23.8 | | 8 |
| 1380 | 82.3 | | 296 | | | | | 708 | | | | plastic/rigid | 462 | 14.5 | 16.1 | 17.2 | | 7 |
| 988 | 87.5 | | 141 | | | | | 876 | 10 | | | fluid-viscous | | 3.7 | 4.5 | 5.8 | | 7 |
| 988 | 87.5 | | 141 | | | | | 876 | 10 | | | fluid-viscous | | 4 | 5.2 | 5.9 | | 7 |

The invention claimed is:

1. A process for manufacturing an item for the building industry starting from bottom ash and/or debris coming from incineration processes of municipal solid waste or waste which may be assimilated thereto, comprising:
    oxidizing amphoteric metals present in said bottom ash and/or debris at an alkaline pH of between 11.8 to 12.8; and
    mixing the oxidized bottom ash and/or debris with one or more binders.

2. The process as claimed in claim 1, further comprising wet-grinding the bottom ash and/or debris.

3. The process as claimed in claim 2, comprising wet-grinding the bottom ash and/or debris prior to oxidizing the amphoteric metals.

4. The process as claimed in claim 2, wherein said wet grinding is preceded by dry pre-grinding the bottom ash and/or debris.

5. The process as claimed in claim 1, wherein the alkaline pH is produced by adding a base to the bottom ash and/or debris, said base selected from the group consisting of: NaOH, KOH, $Ca(OH)_2$, process water and wash water coming from manufacturing processes of cement products, and sodium silicate.

6. The process as claimed in claim 2, wherein said wet grinding comprises:
    grinding the bottom ash and/or debris with one or more ball mills; and
    after grinding, separating coarser fractions of the ground bottom ash and/or debris.

7. The process as claimed in claim 2, wherein after wet grinding, the bottom ash and/or debris comprise particles smaller than 70 μm.

8. The process as claimed in claim 2, further comprising, after wet-grinding and before mixing with the one or more binders, reducing an amount of suspension water present in the wet-ground bottom ash and/or debris.

9. The process as claimed in claim 1, wherein the binder comprises $Ca(OH)_2$, products able to transform into $Ca(OH)_2$ in reaction with water, or CaO.

10. The process as claimed in claim 9, further comprising adding bihydrated calcium sulphate or scagliola ($CaSO_4 \cdot 0.5H_2O$).

11. The process as claimed in claim 10, wherein the mixture comprises, by dry weight:
    bottom ash in a range between 50 and 87%,
    $CaSO_4 \cdot 2H_2O$ in a range between 3 and 34%, and
    $Ca(OH)_2$ in a range between 10 and 35%, or an equal amount of active components.

12. The process as claimed in claim 1, further comprising forming the manufactured item, said forming being selected from one of the following methods: moulding into block making machines, extrusion, casting into footing forms or caissons, casting into large caissons and subsequently cutting into a desired size.

13. The process as claimed in claim 1,
    further comprising:
        forming a manufactured item,
        allowing the item to rest for a period of time ranging between 0 and 24 hours, and
        forced steam curing the item for a period of time ranging between 5 and 48 hours, at a temperature of at least 35° C.

14. The process as claimed in claim 1, further comprising adding to the mixture an additional binder selected from cement or ground blast furnace slag.

15. The process as claimed in claim 14, wherein the additional binder is added in an amount below 50% dry weight of the total amount of binders.

16. The process as claimed in claim 1, further comprising, separating undesired fractions from the bottom ash and/or debris before the oxidizing.

17. The process as claimed in claim 16, wherein separating the undesired fractions comprises screening to remove coarse fractions or magnetically separating magnetic and/or paramagnetic metals.

18. The process as claimed in claim 6, wherein the bottom ash and/or debris is ground with ball mills having grinding bodies larger than 10 mm, with ball mills having grinding bodies in a range of 3-7 mm, or with both ball mills in succession.

19. The process as claimed in claim 6, wherein the coarser fractions of the ground bottom ash and/or debris are separated by filtering or sedimentation.

20. The process as claimed in claim 10, wherein the mixture comprises, by dry weight:
    bottom ash in a range between 50 and 85%,
    $CaSO_4 \cdot 2H_2O$ in a range between 3 and 20%,
    $Ca(OH)_2$ in a range between 12 and 32%, or an equal amount of active components.

21. The process as claimed in claim 13, comprising forced steam curing the item at a temperature of at least 45° C.

22. The process as claimed in claim 9, wherein a weight ratio of the $Ca(OH)_2$, products able to transform into $Ca(OH)_2$ in reaction with water, or CaO and the bottom ash and/or debris is in a range of 1:6 to 1:2.

* * * * *